US012805620B2

(12) United States Patent
Haines

(10) Patent No.: US 12,805,620 B2
(45) Date of Patent: Nov. 24, 2026

(54) CONVERTIBLE SATCHEL WITH INTEGRATED HEAD-MOUNTED DISPLAY

(71) Applicant: A BIG CHUNK OF MUD LLC, Los Angeles, CA (US)

(72) Inventor: J. Michelle Haines, Los Angeles, CA (US)

(73) Assignee: A Big Chunk of Mud LLC, Hollywood, CA (US)

( * ) Notice: Subject to any disclaimer, the term of this patent is extended or adjusted under 35 U.S.C. 154(b) by 134 days.

(21) Appl. No.: 18/200,374

(22) Filed: May 22, 2023

(65) Prior Publication Data

US 2023/0292900 A1 Sep. 21, 2023

Related U.S. Application Data

(62) Division of application No. 16/971,424, filed as application No. PCT/US2018/023611 on Mar. 21, 2018, now Pat. No. 11,696,629.

(Continued)

(51) Int. Cl.
*A45C 15/00* (2006.01)
*A45C 3/02* (2006.01)

(Continued)

(52) U.S. Cl.
CPC ................ *A45C 15/00* (2013.01); *A45C 3/02* (2013.01); *A45C 3/06* (2013.01); *A45C 5/03* (2013.01);

(Continued)

(58) Field of Classification Search
CPC .. A45C 15/00; A45C 3/02; A45C 3/06; A45C 5/03; A45C 11/20; A45C 11/38;

(Continued)

(56) References Cited

U.S. PATENT DOCUMENTS 1,582,458 A 4/1926 Fortney
2,197,152 A 4/1940 Mason (Continued)

FOREIGN PATENT DOCUMENTS

CN 2909320 Y 6/2007
CN 102958399 A 3/2013

(Continued)

OTHER PUBLICATIONS

Billinghurst M., et al., "The MagicBook: A Transitional AR Interface," Computers & Graphics, Oct. 2001, vol. 25, No. 5, ISSN 0004512586, pp. 745-753.

(Continued)

*Primary Examiner* — Tri M Mai
(74) *Attorney, Agent, or Firm* — Manatt, Phelps & Phillips, LLP

(57) ABSTRACT

Described herein are systems and satchels, with an integrated head-mounted display, including a body with sides and a bottom forming an interior and a concavity opposite the interior, the interior and the concavity separated by the bottom and each open at one end, the concavity configured to accept a head-mounted display; and at least one reversible connector configured to reversibly retain the head-mounted display accepted in the concavity, wherein when the head-mounted display is accepted and retained in the concavity the sides are substantially flush with the head-mounted display; and a strap comprising two ends and a reversible connector at each end, the strap convertible to reversibly attach to the body to form a satchel strap or to reversibly attach to the head-mounted display to form a head-mounted display strap.

20 Claims, 6 Drawing Sheets

Related U.S. Application Data

(60) Provisional application No. 62/475,107, filed on Mar. 22, 2017.

(51) Int. Cl.
*A45C 3/06* (2006.01)
*A45C 5/03* (2006.01)
*A45C 11/00* (2006.01)
*A45C 11/20* (2006.01)
*A45C 11/38* (2006.01)
*A45C 13/10* (2006.01)
*A45C 13/22* (2006.01)
*A45F 3/00* (2006.01)
*A45F 3/04* (2006.01)
*G06F 1/16* (2006.01)
*H02J 7/70* (2026.01)

(52) U.S. Cl.
CPC .............. *A45C 11/20* (2013.01); *A45C 11/38* (2013.01); *A45C 13/1069* (2013.01); *A45C 13/22* (2013.01); *A45F 3/04* (2013.01); *G06F 1/1628* (2013.01); *H02J 7/731* (2026.01); *A45C 11/002* (2025.01); *A45C 11/003* (2025.01); *A45C 2013/223* (2013.01); *A45F 2003/003* (2013.01)

(58) Field of Classification Search
CPC ... A45C 13/1069; A45C 13/22; A45C 11/002; A45C 11/003; A45C 2013/223; G06F 1/1628; A45F 2003/003; A45F 3/04; H02J 7/731
See application file for complete search history.

(56) References Cited

U.S. PATENT DOCUMENTS

D175,722 S 10/1955 Elizabeth
2,801,666 A * 8/1957 Steele .................... A45C 15/00 150/113
2,918,997 A 12/1959 Kotkins
D224,072 S 6/1972 Rosenblum
3,696,850 A * 10/1972 Rosenblum .......... A45C 7/0086 190/110
D268,098 S 3/1983 Brown
D271,161 S 11/1983 Compton
D294,124 S 2/1988 Angerman
5,248,037 A 9/1993 Kornberg et al.
D354,520 S 1/1995 Pong
D369,829 S 5/1996 Tomita et al.
D385,781 S 11/1997 Levine et al.
D472,420 S 4/2003 Marsilio et al.
D495,746 S 9/2004 Chen
6,917,370 B2 7/2005 Benton
D566,395 S 4/2008 Langer et al.
7,900,757 B2 3/2011 Sisitsky
D642,743 S 8/2011 Shteysel
D654,113 S 2/2012 Clegg et al.
D668,119 S 10/2012 Everson
D668,540 S 10/2012 Lutzig
D688,420 S 8/2013 Lai
D691,653 S 10/2013 Benadon et al.
D692,949 S 11/2013 Shamoon
D701,865 S 4/2014 Solling
8,957,835 B2 2/2015 Hoellwarth
9,256,284 B2 2/2016 Hanaya et al.
9,415,621 B2 8/2016 Fahrer
D769,727 S 10/2016 Lohuis et al.
D780,844 S 3/2017 Frommelt
D803,315 S 11/2017 Hsieh
D820,080 S 6/2018 Kase et al.
D850,006 S 5/2019 Staab
D882,392 S 4/2020 Haines
10,748,339 B2 8/2020 Haines
11,696,629 B2 * 7/2023 Haines .................. A45C 15/00 190/102
2002/0188676 A1 12/2002 Iai et al.
2002/0188678 A1 12/2002 Edecker et al.
2003/0059758 A1 3/2003 Cohen et al.
2004/0193441 A1 9/2004 Altieri
2005/0242771 A1 11/2005 Blum et al.
2006/0113203 A1 6/2006 Daley
2008/0172680 A1 7/2008 Gyorfi et al.
2009/0009938 A1 1/2009 Daley, III
2009/0026749 A1 1/2009 Burrows
2010/0079356 A1 4/2010 Hoellwarth
2010/0146389 A1 6/2010 Yoo et al.
2010/0220434 A1 9/2010 Daley, III
2010/0232770 A1 9/2010 Prestenback et al.
2011/0107239 A1 5/2011 Adoni et al.
2011/0181497 A1 7/2011 Raviv
2011/0315589 A1 12/2011 Thomas
2012/0036027 A1 2/2012 Florschuetz et al.
2012/0122570 A1 5/2012 Baronoff
2012/0264510 A1 10/2012 Wigdor et al.
2012/0329558 A1 12/2012 Haigh-Hutchinson
2013/0117377 A1 5/2013 Miller
2013/0124326 A1 5/2013 Huang et al.
2013/0133795 A1 * 5/2013 Zhou ...................... A45C 13/26 150/104
2013/0147836 A1 6/2013 Small et al.
2013/0196772 A1 8/2013 Latta et al.
2013/0201185 A1 8/2013 Kochi
2013/0222367 A1 8/2013 Mariappan
2013/0238413 A1 9/2013 Carlson et al.
2013/0248412 A1 9/2013 Olsson et al.
2013/0249944 A1 9/2013 Raghoebardayal
2013/0307856 A1 11/2013 Keane et al.
2013/0321390 A1 12/2013 Latta et al.
2013/0339228 A1 12/2013 Shuster et al.
2014/0002359 A1 1/2014 Weising et al.
2014/0002491 A1 1/2014 Lamb et al.
2014/0002495 A1 1/2014 Lamb et al.
2014/0002497 A1 1/2014 Lucas-Woodley et al.
2014/0078174 A1 3/2014 Williams et al.
2014/0166658 A1 6/2014 Hamra
2014/0175140 A1 6/2014 Folise
2014/0191929 A1 7/2014 Kim
2014/0208272 A1 7/2014 Vats et al.
2014/0210710 A1 7/2014 Shin et al.
2014/0267637 A1 9/2014 Hoberman et al.
2014/0361976 A1 12/2014 Osman et al.
2014/0367004 A1 12/2014 Miki
2015/0209664 A1 7/2015 Haseltine
2015/0253574 A1 9/2015 Thurber
2015/0254903 A1 9/2015 Sumner et al.
2015/0268717 A1 9/2015 Schlumberger et al.
2015/0313337 A1 * 11/2015 Swartzel .............. A44B 11/266 150/108
2016/0062125 A1 3/2016 Baek et al.
2016/0163105 A1 6/2016 Hong et al.
2016/0203645 A1 7/2016 Knepp et al.
2016/0217699 A1 7/2016 Thankavel
2016/0240007 A1 8/2016 Weerasinghe
2016/0253745 A1 9/2016 Lee
2016/0267720 A1 9/2016 Mandella et al.
2016/0378296 A1 12/2016 Mishra et al.
2017/0061702 A1 3/2017 Christen et al.
2017/0109940 A1 4/2017 Guo et al.
2017/0115488 A1 4/2017 Ambrus et al.
2017/0293351 A1 10/2017 Li
2017/0352187 A1 12/2017 Haines
2018/0070693 A1 * 3/2018 Bloomfield ............ A45C 15/00
2018/0158133 A1 6/2018 Davis et al.
2018/0336735 A1 11/2018 Haines
2020/0334914 A1 10/2020 Haines
2020/0397109 A1 12/2020 Haines

(56) References Cited

U.S. PATENT DOCUMENTS

| | | | |
|---|---|---|---|
| 2021/0122211 | A1 | 4/2021 | Miller |
| 2021/0264676 | A1 | 8/2021 | Haines |

FOREIGN PATENT DOCUMENTS

| | | | |
|---|---|---|---|
| CN | 204617351 | U | 9/2015 |
| JP | S50152746 | A | 12/1975 |
| JP | S5891927 | U | 6/1983 |
| JP | S63197524 | U | 12/1988 |
| JP | H04207868 | A | 7/1992 |
| JP | H05186367 | A | 7/1993 |
| JP | 3086669 | U | 6/2002 |
| JP | 3093914 | U | 5/2003 |
| JP | 2008068060 | A | 3/2008 |
| JP | 3164825 | U | 12/2010 |
| JP | 2011077960 | A | 4/2011 |
| JP | 2014127987 | A | 7/2014 |
| KR | 910017970 | A | 11/1991 |
| KR | 20070084539 | A | 8/2007 |
| KR | 20140119291 | A | 10/2014 |
| KR | 20150016840 | A | 2/2015 |
| WO | 2017210522 | A1 | 12/2017 |

OTHER PUBLICATIONS

Office Action for Korean Patent Application No. 10-2019-7031155, mailed Aug. 1, 2023, 5 Pages.

U.S Copyright Office—“Help: Daily Newspapers,” U.S Copyright Office, Feb. 28, 2013, 4 pages.

* cited by examiner

CONVERTIBLE SATCHEL WITH INTEGRATED HEAD-MOUNTED DISPLAY

PRIORITY CLAIMS/RELATED APPLICATIONS

This application is a divisional of and claims priority under 35 USC 120 to U.S. patent application Ser. No. 16/971,424 filed Aug. 20, 2020 and entitled "Convertible Satchel with Integrated Head-Mounted Display", which in turn is a continuation of and claims priority under 35 USC 120 to U.S. Provisional Patent Application No. 62/475,107 filed on Mar. 22, 2017, and entitled "Convertible Satchel with Integrated Head-Mounted Display" which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

A head-mounted display generally refers to a device worn on the head or as part of a helmet that has a display optic in front of one or each eye. Users of head-mounted displays are immersed in an array of multimedia stimuli, allowing the users to interact with the environment and engage in sensory experiences, including sight, touch, hearing, and smell. Head-mounted displays are becoming increasingly popular and accessible to the general public, allowing for a wider audience to benefit from this experience.

SUMMARY OF THE INVENTION

Despite the interactive and engaging user experience provided by current head-mounted displays, they are limited in multiple aspects. First, the size and configuration of head-mounted displays may be bulky. This makes easy access, efficient storage, and reliable safekeeping of the displays challenging. Second, head-mounted displays may have supporting components separate from the display itself. This increases the chance that these components (e.g., a strap to the head-mounted display) become misplaced, lost, or stolen. These problems are further exacerbated if the user is traveling. Travelers are often limited in how much they can carry, discouraging users from bringing along their head-mounted displays and enjoying their benefits while traveling.

The system and satchel disclosed herein address the problems above. The subject matter described herein includes a system which provides users a convertible satchel with integrated head-mounted display, which provides users the tools to effectively store and carry their head-mounted displays while mitigating the risk of losing components of these displays. The subject matter described herein further allows the user to easily access their head-mounted displays and enjoy their benefits anywhere they go or share their benefits with others.

In one aspect, disclosed herein are satchels comprising: a body comprising: sides and a bottom forming an interior and a concavity opposite the interior, the interior and the concavity separated by the bottom and each open at one end, the concavity configured to accept a head-mounted display; and at least one reversible connector configured to reversibly retain the head-mounted display accepted in the concavity, wherein when the head-mounted display is accepted and retained in the concavity the sides are substantially flush with the head-mounted display; and a strap comprising two ends and a reversible connector at each end, the strap convertible to reversibly attach to the body to form a satchel strap or to reversibly attach to the head-mounted display to form a head-mounted display strap. In various embodiments, the satchel comprises a purse, backpack, duffel bag, lunchbox, luggage, camera bag, or brief case. In some embodiments, the satchel further comprises a reversibly closable lid enclosing the open end of the interior of the satchel. In some embodiments, the head-mounted display is a full-sized head-mounted display. In some embodiments, the head-mounted display is a virtual reality head-mounted display. In some embodiments, the head-mounted display is an augmented reality head-mounted display. In some embodiments, the at least one reversible connector of the body is magnetic. In some embodiments, the reversible connectors of the strap are magnetic. In some embodiments, the concavity is configured to accept the head-mounted display without reducing the storage capacity of the interior of the satchel. In some embodiments, a head-mounted display accepted and retained in the concavity is removable from the concavity without accessing the interior of the satchel. In some embodiments, the strap has an adjustable length. In some embodiments, a head-mounted display accepted and retained in the concavity is configured to internally store a mobile computing device. In some embodiments, the satchel comprises a charging station for one or more electronic devices. In some embodiments, the electronic device comprises a head-mounted display, a mobile device, a smart phone, a camera, or a smart watch.

In another aspect, disclosed herein are systems comprising: a head-mounted display; a body comprising sides and a bottom forming an interior and a concavity opposite the interior, the interior and the concavity separated by the bottom and each open at one end, the concavity configured to accept the head-mounted display, and at least one reversible connector configured to reversibly retain the head-mounted display accepted in the concavity, wherein when the head-mounted display is accepted and retained in the concavity the sides are substantially flush with the sides of the head-mounted display; and a strap comprising two ends and a reversible connector at each end, the strap convertible to reversibly attach via the reversible connectors to the body or to reversibly attach via the reversible connectors to the head-mounted display. In various embodiments, the body comprises a purse, backpack, duffel bag, lunchbox, luggage, camera bag, or brief case. In some embodiments, the body further comprises a reversibly closable lid enclosing the open end of the interior. In some embodiments, the head-mounted display is a full-sized virtual reality head-mounted display. In some embodiments, the head-mounted display is a full-sized augmented reality head-mounted display. In some embodiments, the at least one reversible connector of the body is magnetic or wherein the reversible connectors of the strap are magnetic. In some embodiments, the concavity is configured to accept the head-mounted display without reducing the storage capacity of the interior. In some embodiments, the head-mounted display is removable from the concavity without accessing the interior. In some embodiments, the strap has an adjustable length. In some embodiments, the head-mounted display is configured to internally store a mobile computing device when accepted and retained in the concavity. In some embodiments, the system comprises a charging station for one or more electronic devices. In some embodiments, the electronic device comprises a head-mounted display, a mobile device, a smart phone, a camera, or a smart watch.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Described herein, in certain embodiments, are satchels comprising: a body comprising: sides and a bottom forming an interior and a concavity opposite the interior, the interior and the concavity separated by the bottom and each open at one end, the concavity configured to accept a head-mounted display; and at least one reversible connector configured to reversibly retain the head-mounted display accepted in the concavity, wherein when the head-mounted display is accepted and retained in the concavity the sides are substantially flush with the head-mounted display; and a strap comprising two ends and a reversible connector at each end, the strap convertible to reversibly attach to the body to form a satchel strap or to reversibly attach to the head-mounted display to form a head-mounted display strap.

Also described herein, in certain embodiments, are systems comprising: a head-mounted display; a body comprising sides and a bottom forming an interior and a concavity opposite the interior, the interior and the concavity separated by the bottom and each open at one end, the concavity configured to accept the head-mounted display, and at least one reversible connector configured to reversibly retain the head-mounted display accepted in the concavity, wherein when the head-mounted display is accepted and retained in the concavity the sides are substantially flush with the sides of the head-mounted display; and a strap comprising two ends and a reversible connector at each end, the strap convertible to reversibly attach via the reversible connectors to the body or to reversibly attach via the reversible connectors to the head-mounted display.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Overview

Figure 1:
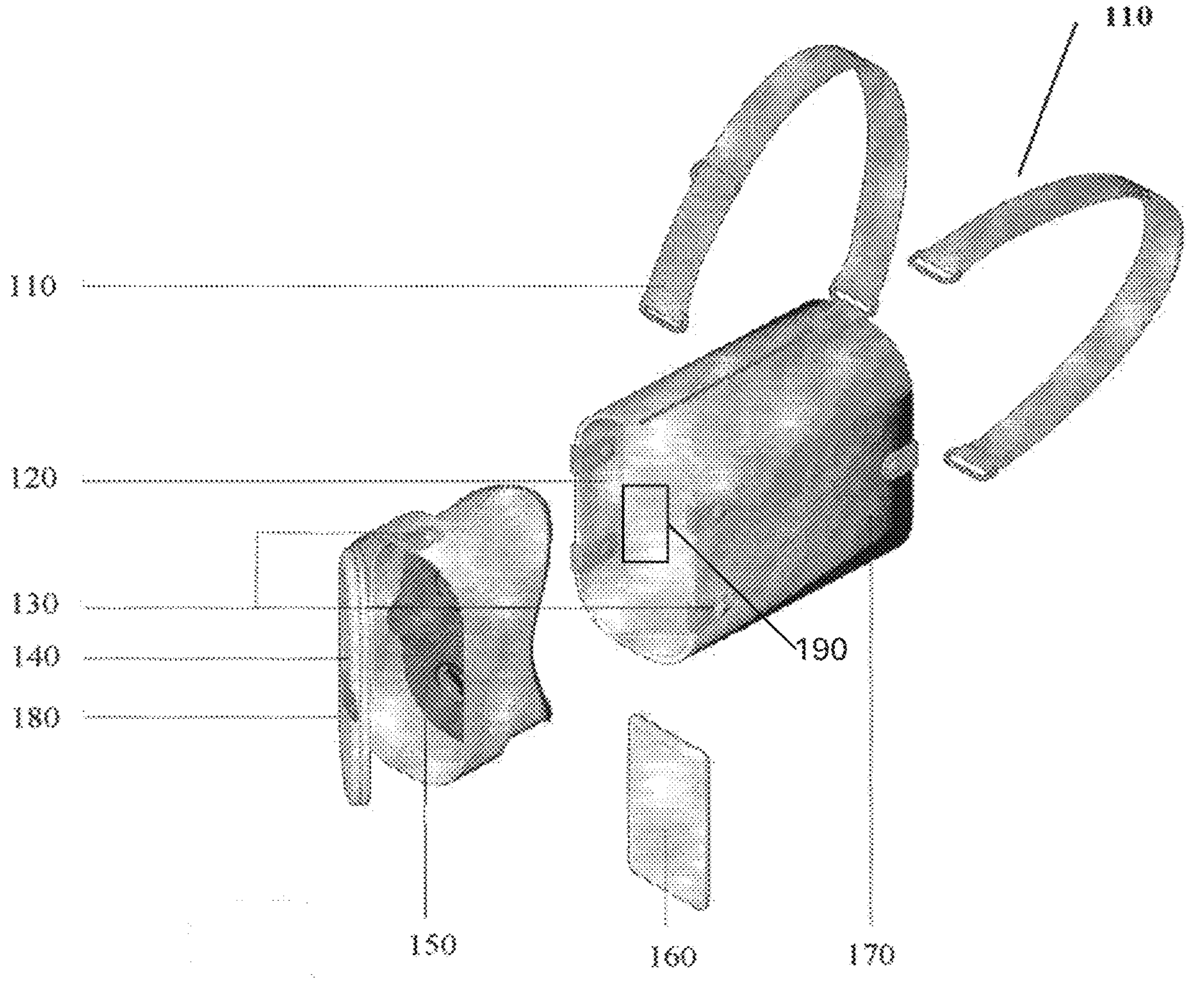
FIG. 1 shows a non-limiting example of a convertible satchel with a head-mounted display; in this case, a bag 170, a resizable strap 110 with two possible configurations, a bag headset area 120, a head mounted display 150 with a closeable lid 140, buttons 130 to attach the head mounted display 150 to the bag 170, a button 180 to keep the lid 140 closed, and a mobile phone device 160.

Referring to FIG. 1, in a particular embodiment, a convertible bag, its various components, and a mobile phone device are provided. FIG. 1 further shows various components of the bag, including: the bag 170, a resizable strap 110 with two possible configurations, a bag headset area 120, a head mounted display 150 with a closeable lid 140, buttons 130 to attach the head mounted display 150 to the bag 170, a button 180 to keep the lid 140 closed, and a mobile phone device 160. The bag 170 of the satchel has a charging station 190 for electronic devices.

Figure 2:
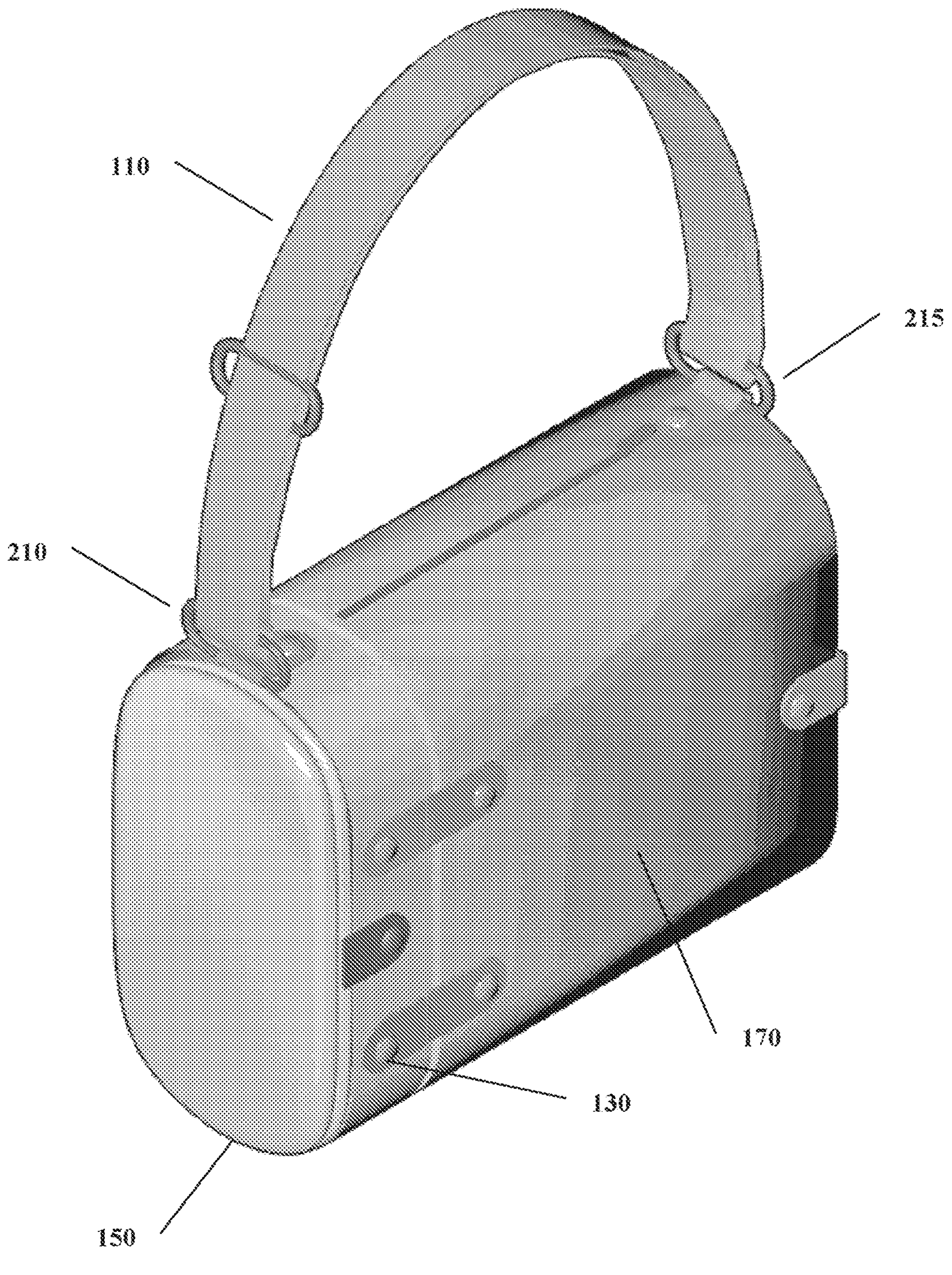
FIG. 2 shows another non-limiting example of a convertible satchel with a head-mounted display; in this case, a bag 170 in a non-head mounted display use state, where a resizable strap 110 is attached to two top loops, one loop on the head mounted display end 210 and the other loop on the non-head mounted display end 215, and buttons 130 are attaching the head mounted display 150 to the bag 170.

Referring to FIG. 2, in a particular embodiment, a convertible bag is provided. FIG. 2 further shows the bag 170 in a non-head mounted display use state, where a resizable strap 110 is attached to two top loops, one loop on the head mounted display end 210 and the other loop on the non-head mounted display end 215, and buttons 130 are attaching the head mounted display 150 to the bag 170.

Figure 3:
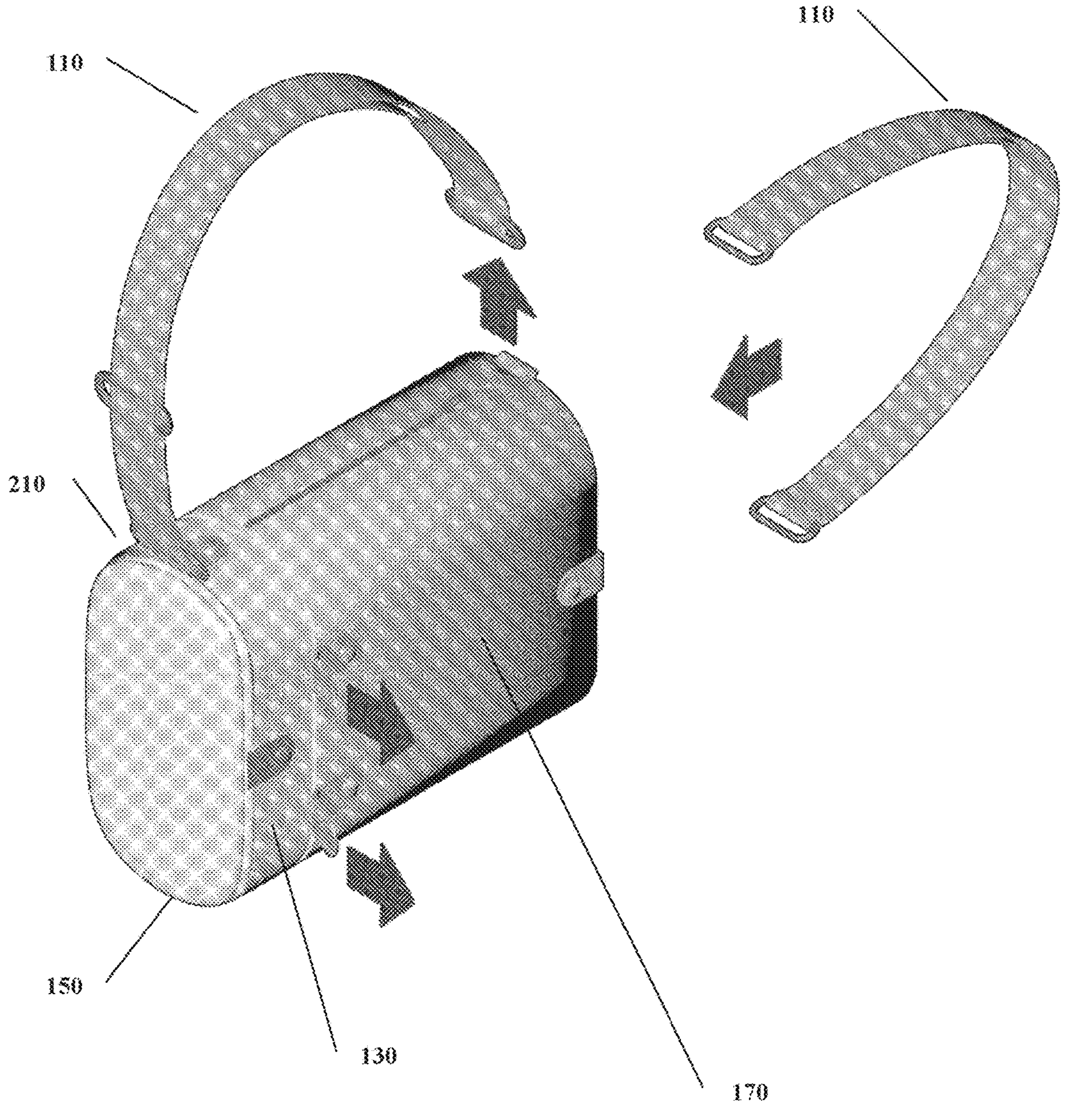
FIG. 3 shows another non-limiting example of a convertible satchel with a head-mounted display; in this case, a bag 170 with a resizable strap 110 in two possible configurations, i.e., one end attached to the top loop on the head mounted display end 210 or both ends positioned to attach to the side of the bag, and buttons 130 are not attaching the head mounted display 150 to the bag 170.

Referring to FIG. 3, in a particular embodiment, the convertible bag in an alternative configuration is provided. FIG. 3 further shows the bag 170 with a resizable strap 110 in two possible configurations, i.e., one end attached to the top loop on the head mounted display end 210 or both ends positioned to attach to the side of the bag, and buttons 130 are not attaching the head mounted display 150 to the bag 170.

Figure 4:
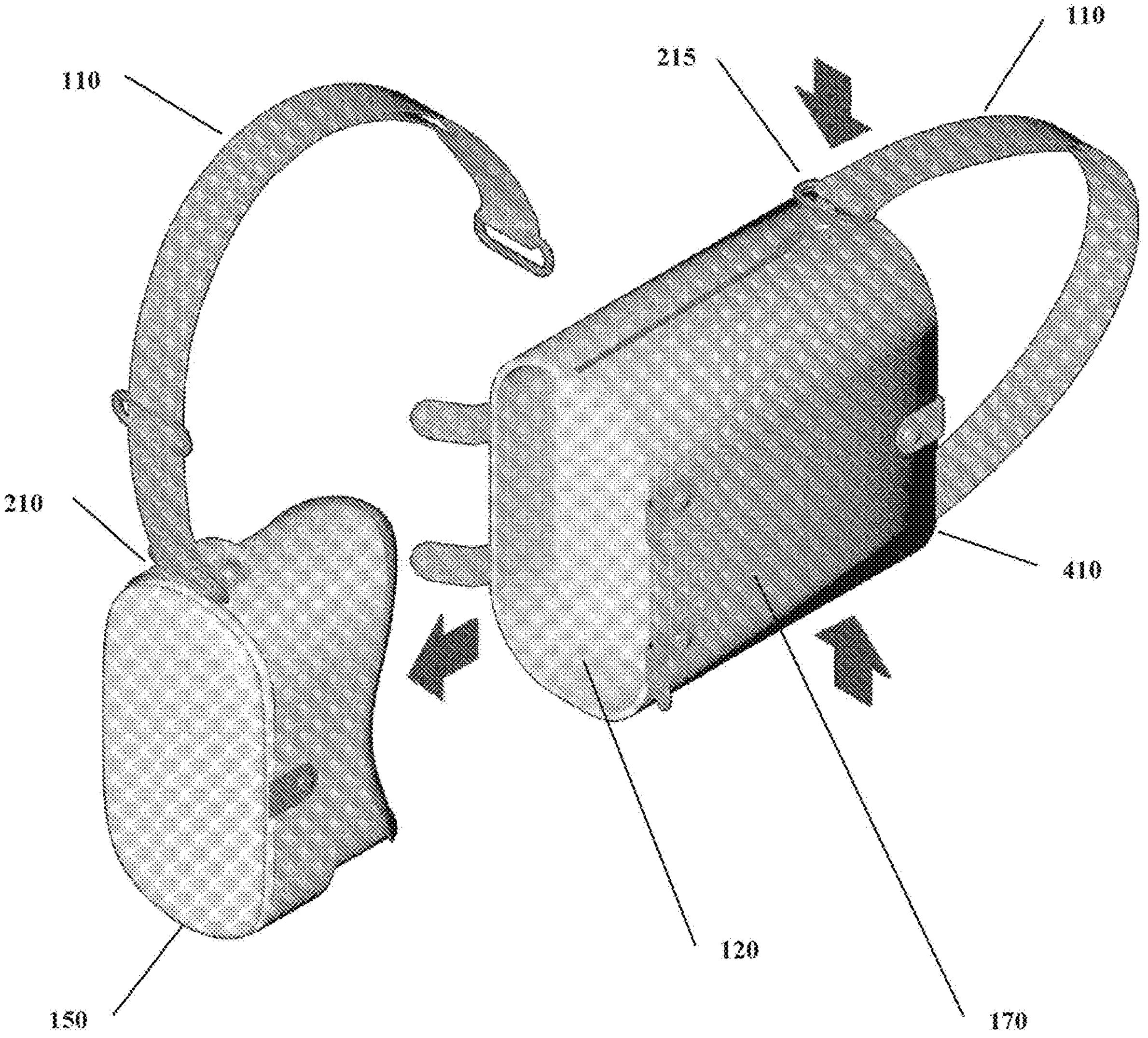
FIG. 4 shows another non-limiting example of a convertible satchel with a head-mounted display; in this case, a bag 170 with a resizable strap 110 in two possible configurations, i.e., one end attached to the top loop on the head mounted display end 210 or both ends attached to the top and bottom side loops 215 and 410, and the head mounted display 150 is fully detached from the bag 170, exposing a bag headset area 120.

Referring to FIG. 4, in a particular embodiment, a convertible bag in a different configuration is provided. FIG. 4 further shows the bag 170 with a resizable strap 110 in two possible configurations, i.e., one end attached to the top loop on the head mounted display end 210 or both ends attached to the top and bottom side loops 215 and 410, and the head mounted display 150 is fully detached from the bag 170, exposing a bag headset area 120.

Figure 5:
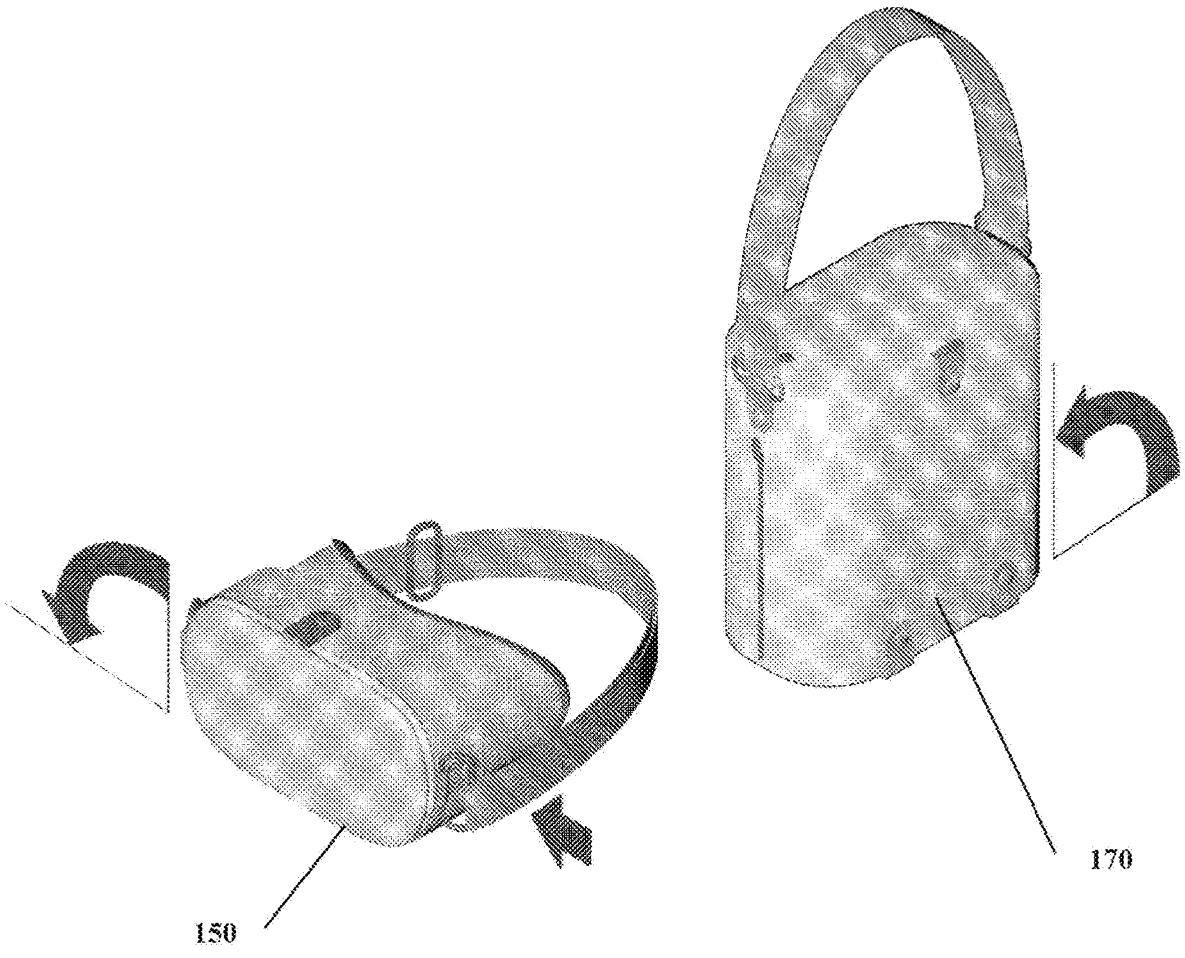
FIG. 5 shows another non-limiting example of a convertible satchel with a head-mounted display; in this case, a bag 170 and head mounted display 150 fully detached from one another and strapped on both ends.

Referring to FIG. 5, in a particular embodiment, the bag 170 and head mounted display 150 fully detached from one another and strapped on both ends are provided.

Figure 6:
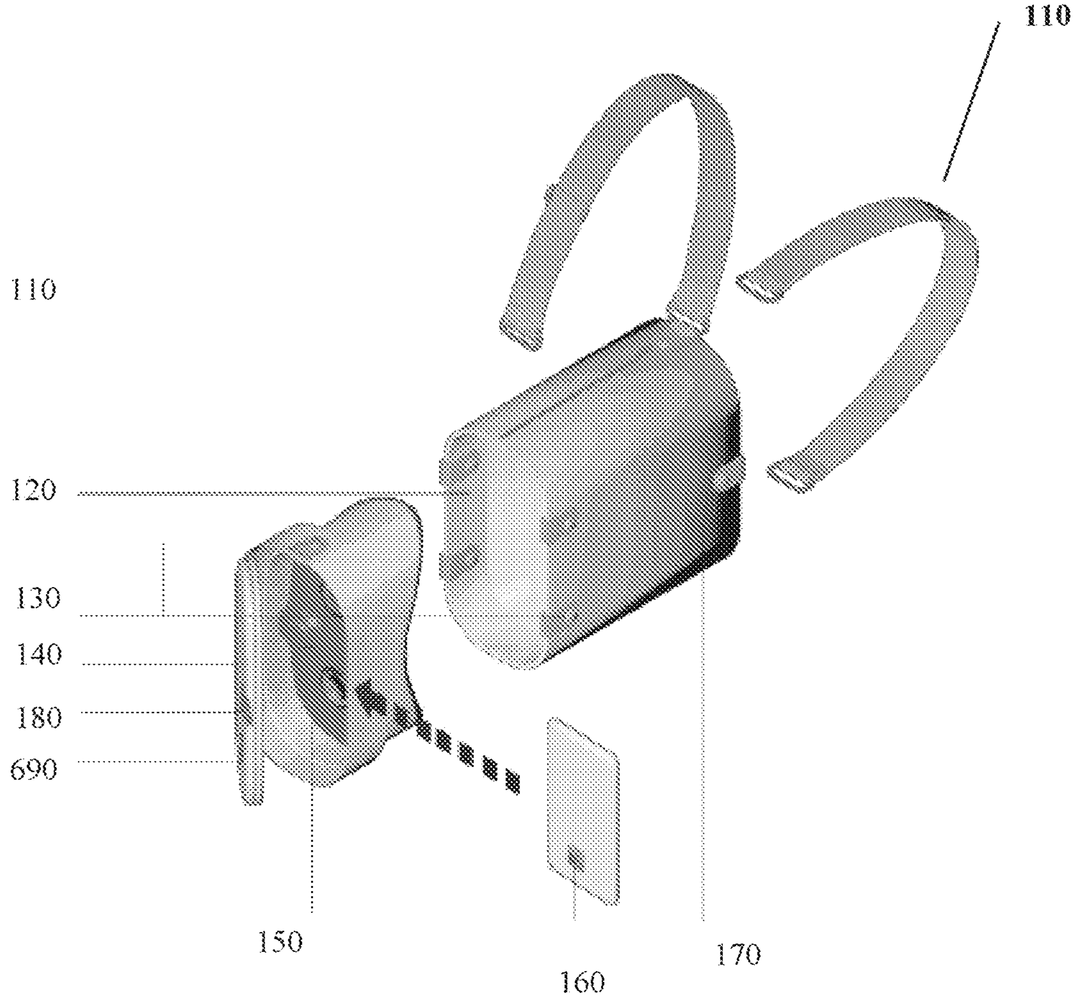
FIG. 6 shows another non-limiting example of a convertible satchel with a head-mounted display; in this case, a bag 170, a resizable strap 110 with two possible configurations, a bag headset area 120, a head mounted display 150 with a closeable lid 140, buttons 130 to attach the head mounted display 150 to the bag 170, a button 180 to keep the lid 140 closed, a camera with augmented reality capability 690, and a mobile phone device with a camera 160.

Referring to FIG. 6, in a particular embodiment, a convertible bag, its various components, and a mobile phone device are provided. FIG. 6 further shows various components of the bag, including: the bag 170, a resizable strap 110 with two possible configurations, a bag headset area 120, a head mounted display 150 with a closeable lid 140, buttons 130 to attach the head mounted display 150 to the bag 170, a button 180 to keep the lid 140 closed, a camera with augmented reality capability 690, and a mobile phone device 160.

Satchel

The subject matter described herein, in some cases, includes a satchel. In some embodiments, the satchel comprises a body and a strap, wherein the body comprise sides and bottom forming an interior and a concavity opposite the interior, the interior and the concavity separated by the bottom and each open at one end. In some embodiments, the satchel is made of, by way of non-limiting examples, leather, cloth, fabric, polyurethane, nylon, cotton canvas, wool, silk, polyethylene, carbon glass, aramid, Dyneema®, Spectra®, Velcro®, denim, plastic, polypropylene, webbing, polyester, rayon, linen, plastic, steel, paper, or any combination herein. In other embodiments, the concavity is configured to accept a head-mounted display. In further embodiments, the concavity is configured to accept the head-mounted display without reducing the storage capacity of the interior of the satchel. In even further embodiments, wherein a head-mounted display accepted and retained in the concavity is configured to internally store a mobile computing device. In some embodiments, the satchel comprises at least one reversible connector configured to reversibly retain the head-mounted display accepted in the concavity. In further embodiments, the at least one reversible connector of the body is magnetic. In some embodiments, wherein when the head-mounted display is accepted and retained in the concavity the sides are substantially flush with the head-mounted display. In further embodiments, wherein a head-mounted display accepted and retained in the concavity is removable from the concavity without accessing the interior of the satchel. In other embodiments, the satchel comprises a reversibly closable lid enclosing the open end of the interior of the satchel. Commercially available satchels include, by way of non-limiting examples, a purse, backpack, duffel bag, lunchbox, luggage, camera bag, brief case, messenger bag, container, gunny sack, handbag, packsack, reticule, sack, saddlebag, school bag, carpetbag, haversack, knapsack, sports bag, portmanteau, rucksack, suitcase, valise, or traveling bag.

Strap

The subject matter described herein, in some cases, includes one or more straps. In some embodiments, the strap is made of, by way of non-limiting examples, leather, cloth, fabric, polyurethane, nylon, cotton canvas, wool, silk, polyethylene, carbon glass, aramid, Dyneema®, Spectra®, Velcro®, denim, plastic, polypropylene, webbing, polyester, rayon, linen, plastic, steel, paper, or any combination herein. In some embodiments, the strap is adjustable using one or more clips, fasteners, chains, hooks, zippers, or rings. In other embodiments, the strap is made up of a stretchable material including, by way of non-limiting examples, webbing. In some embodiments, the strap comprises two ends or more ends and a reversible connector at each end. In some embodiments, the strap comprises three ends where two ends attach to the sides of the head mounted display and the third end extends from the middle portion of the strap to the center portion of the head mounted display. In some other embodiments, two separate straps disconnect from the satchel to combine to form a single strap with three ends for the head mounted display where two ends connect to each side of the head mounted display and the third end forms an over the head strap for the head mounted display. In other embodiments, the strap is convertible to reversibly attach to the body to form a satchel strap or to reversibly attach to the head-mounted display to form a head-mounted display strap. In further embodiments, the reversible connectors of the strap are magnetic. In some embodiments, when the strap is not being used for the head mounted display, the strap has functional use. In further embodiments, the strap is used to secure or fasten items. Secured or fastened items include, by way of non-limiting examples, itself, fasteners, other straps, the satchel, the head mounted display, or other satchels. In other embodiments, when the strap is not being used for as a strap for the head mounted display, the strap is ornamental or decorative.

Head-Mounted Display

The subject matter described herein, in some cases, includes a head-mounted display (HMD). In some embodiments, the HMD is worn on the head of a user. In some embodiments, the HMD is an eyeglass or a visor. In other embodiments, the HMD is attached to the helmet of a user. In further embodiments, the HMD comprises one or more lens displays. In even further embodiments, the lens displays on the HMD comprise cathode ray tube displays, liquid crystal displays, liquid crystal on silicon displays, or organic light-emitting diode displays. In still further embodiments, HMDs comprise see-through techniques comprising diffractive waveguide, holographic waveguide, polarized waveguide, reflective waveguide, Clear-Vu reflective waveguide, and switchable waveguide. In other embodiments, HMDs are full-sized. In further embodiments, HMDs are virtual reality. In some embodiments, the head mounted display is a VR head mounted display, VR headset, or VR goggles. In other embodiments, the head mounted display can portray 3D multimedia. In other embodiments, the head mounted display can portray augmented reality (AR). Commercially available HMD manufacturers and brands include, by way of non-limiting examples, Avegant, Atari Jaguar VR, Canon VR, Carl Zeiss VR One, Daqri Smart Helmet, eMagin EMAN, Epson®, HTC® Vive, ImmersiONVRelia, Kaiser Electro-Optics, Kopin Corporation Golden-i, LASTER Technologies, Liquid Image, Magic Leap, Merge VR, Microsoft® HoloLens, MicroOptical, Motorola®, MyVu, Nintendo® Virtual Boy, novero, Oculus® VR, Olympus®, Recon Instruments, Rockwell Collins® Optronics, Samsung® Gear VR, SEGA® Sega VR, Sensics, Sony® PlayStation VR, Takara Dynovisor, TDVision, VictorMaxx CyberMaxx, VPL Research, VRVana, and Vuzix. Commercially available optical HMD manufacturers and brands include, by way of non-limiting examples, Google® Glass, Sony® Glasstron, Olympus® Optical PC Eye-Trek, IBM®, Nokia®, Mirage Innovations, DigiLens, SBG Labs VIRTUALITY HMEyetrack, Lumus, MicroVision Nomad, Penny C Wear, Brother Industries, Konica Minolta®, Optinvent, Optical Research Associates, Augmented Vision, Vuzix, Atheer Labs, Meta, GlassUp, Laster Technologies, Innovega, Fraunhofer COMEDD, The Technology Partnership, Telepathy, Oculon Optoelectronics, Fujitsu, Baidu®, Microsoft®, LAFORGE Optical, Toshiba Glass, Ashkelon Eyeware Technologies, BAE Systems, Silicon Micro Display, Shimadzu, TDK, ODALab, Virtual Vision Inc., eMagin, nVision Industries, NVIS, Liteye Systems, Trivisio, i-O Display Systems, and Cinoptics.

In still further embodiments, the HMD comprises a head mount and a display device. In some embodiments, the display device is a smartphone. In other embodiments, the display device is a tablet. In a particular embodiment, the head mount is Google® Cardboard. Commercially available display devices compatible with Google® Cardboard include, by way of non-limiting examples, Amazon® Fire, HTC® One, Apple® iPhone 6, Google® Nexus 5, Motorola® Moto X, Samsung® Galaxy S6, Samsung® Galaxy Tab, and Sony® Tablet S. One of ordinary skill in the art to which this invention belongs would recognize that any device comprising a high resolution display screen and equipped with a gyroscope and accelerometer as a means of navigation is capable of being used as an HMD.

Virtual Reality (VR)

In some embodiments, system and satchel described herein include virtual reality (VR), or use of the same. In some embodiments, VR is an immersive multimedia computer-simulated reality. In other embodiments, a computer system is configured to replicate a real, imagined, or real and imagined environment. In further embodiments, VR is experienced through a display. In even further embodiments, VR is displayed through a device screen or through a head-mounted display (HMD). In still further embodiments, VR devices are connected through a server or a direct peer-to-peer connection. In still further embodiments, VR devices are an external sensor device configured to provide sensory feedback. Many suitable implementations of external sensor devices are contemplated, including, but not limited to, a keyboard, a mouse, a controller, a glove, a game pad device, or a game accessory device. In some embodiments, VR is applied as an overlay to the real-world environment to create augmented reality (AR).

Augmented Reality (AR)

In some embodiments, system and satchel described herein include augmented reality (AR), or use of the same. In some embodiments, AR provides a direct or indirect view of a physical, real-world environment to the user while also providing elements that are augmented or supplemented by computer-generated sensory input, including, but not limited to, sound, video, graphics, or GPS data. In some embodiments, AR allows the information about the surrounding real world to become interactive and digitally manipulable. In some embodiments, the AR information can be virtual or real, e.g., seeing other real sensed or measured information. Commercially available AR manufacturers and brands include, by way of non-limiting examples, Microsoft® HoloLens, Sony® SmartEyeglass, Epson® Moverio BT-200, Google® Glass, Vuzix M100® Smart Glasses, Meta 1, Recon Jet, Optivent Ora-1, GlassUp, and Z800 ProAR. One of ordinary skill in the art to which this invention belongs would recognize that any device that provides a direct or indirect view or supplemented by computer-generated input is capable of being used as an AR device.

Three-Dimensional (3D) Multimedia

In some embodiments, system and satchel described herein include three dimension (3D) multimedia, or use of the same. In some embodiments, 3D multimedia is a motion picture that enhances the illusion of depth perception through stereoscopic photography. In other embodiments, 3D multimedia utilizes special projection hardware and/or eyewear to limit the visibility of each image in the pair to the viewer's left or right eye only.

Mobile Devices

The subject matter described herein, in some cases, includes a mobile device. Commercially available mobile devices include, by way of non-limiting examples, cellular phones, smartphones, personal digital assistant, laptops, tablets, or smartwatches. One of ordinary skill in the art to which this invention belongs would recognize that any device comprising a small computing device typically small enough to hold and operate in the hand, having a display screen, and having an operating system capable of running mobile applications is capable of being used as a mobile device.

EXAMPLES

The following illustrative examples are representative of embodiments of the software applications, systems, and methods described herein and are not meant to be limiting in any way.

Example 1—Sharing 360° Panoramic Pictures at a Picnic

A 21-year old college student is packing for a Sunday picnic with her friends. She is planning to share 360° panoramic photos of her vacation to Mexico—photos that she took on her Samsung® Galaxy S6 phone and that require a head mounted display to fully experience. As she is packing the bulky picnic supplies into her sports bag, she does not worry about separately making room for a head mounted display because the sports bag is already fitted with a Samsung® Gear VR. She is similarly not anxious about misplacing or damaging any accessories because they are stored in a separate compartment from her picnic supplies. The student is able to conveniently carry all the picnic supplies and Samsung® Gear VR to the park in one sports bag. At the picnic, the student easily detaches the Samsung® Gear VR magnetically connected to her sports bag, takes off the sports bag strap, and converts the sports bag strap into the Samsung® Gear VR strap. She proceeds to insert her Samsung® Galaxy S6 phone into the Samsung® Gear VR, adjusts the strap length to fit comfortably around her head, and puts the Samsung® Gear VR on her head. After looking through some of her photos, she takes off the headset so she can share the immersive experience with her friends. Her friends easily adjust the strap to fit their differing head sizes. The student and her friends immerse themselves in the photos, enjoying the panoramic views of the beach, museums, and other outings. At the end of the picnic, the student easily re-attaches the Samsung® Gear VR back to her sports bag and conveniently carries the equipment and picnic supplies back home in one bag.

Example 2—Watching 3D Movies on a Plane

A 40-year old woman is on a cross-country flight on a business trip. She is browsing the entertainment options on the flight, but none of them interest her. She is in the mood to watch a 3D movie—a feature unavailable on the flight. The business woman reaches down to her carry-on luggage stowed under her seat. She unclasped the buttons attaching her head mounted display, a Carl Zeiss® VR One, to her luggage and inserts her Apple® iPhone 6, which is configured to play 3D movies, into the concavity of the Carl Zeiss® VR One. She then disconnects and reconfigures the carry-one luggage strap to become the strap of her Carl Zeiss® VR One. She is able to easily adjust the strap so it fits snugly around her head. The woman enjoys the rest of her flight watching her favorite 3D movies using her Carl Zeiss® VR One and Apple® iPhone 6. When she reaches her destination, she easily re-attaches her Carl Zeiss® VR One and strap back to her carry-on luggage and exits the plane carrying her head mounted display equipment and luggage in one bag.

Example 3—Teaching Biology at a Student's Home with a VR Game

A 31-year old private biology tutor is teaching a junior high school student at the student's home. The lesson unit is about viruses and how they interact with the human body. The tutor first verbally explains the structures within the virus and cells, but the student does not understand. The student continues to struggle even after the tutor draws pictures of the virus and cells on a sheet of paper. The tutor reaches for his messenger bag and detaches his head mounted display, a HTC® Vive, which is configured to play a VR game that takes the user inside the body. He also detaches an ornamental strap from his messenger bag to become the HTC® Vive strap. The strap length was originally configured to fit the tutor's head, but the tutor is able to easily adjust the size to comfortably fit the student's head. The student puts on the HTC® Vive. The tutor turns on the VR game and the student is in an immersive VR environment, traveling through a bloodstream, going inside cells, and seeing up-close how organelles work to fight viruses. After playing the VR game, the student better appreciates how viruses work and how they interact with the human body. After the lesson is complete, the tutor easily re-attaches his HTC® Vive and strap back to his messenger bag and goes home.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A satchel comprising:

a body comprising: sides and a bottom forming an interior and a concavity opposite the interior, the interior and the concavity separated by the bottom and each open at one end, the concavity configured to accept a head-mounted display; and at least one reversible connector configured to reversibly retain the head-mounted display accepted in the concavity, wherein when the head-mounted display is accepted and retained in the concavity and the sides are substantially flush with the head-mounted display;

a strap comprising two ends and a reversible connector at each end, the strap convertible to reversibly attach to the body to form a satchel strap or to reversibly attach to the head-mounted display to form a head-mounted display strap; and the head-mounted display accepted and retained in the concavity that is removable from the concavity without accessing the interior of the satchel.

2. The satchel of claim 1, wherein the satchel further comprises a reversibly closable lid enclosing the open end of the interior of the satchel.

3. The satchel of claim 1, wherein the head-mounted display is a full-sized head-mounted display.

4. The satchel of claim 1, wherein the head-mounted display is a virtual reality head-mounted display.

5. The satchel of claim 1, wherein the head-mounted display is an augmented reality head-mounted display.

6. The satchel of claim 1, wherein the at least one reversible connector of the body is magnetic.

7. The satchel of claim 1, wherein the reversible connectors of the strap are magnetic.

8. The satchel of claim 1, wherein the concavity is configured to accept the head-mounted display without reducing the storage capacity of the interior of the satchel.

9. The satchel of claim 1, wherein the strap has an adjustable length.

10. The satchel of claim 1, wherein the satchel comprises a charging station for one or more electronic devices.

11. The satchel of claim 10, wherein the electronic device comprises a head mounted display, a mobile device, a smart phone, a camera, or a smart watch.

12. A satchel comprising:

a body comprising: sides and a bottom forming an interior and a concavity opposite the interior, the interior and the concavity separated by the bottom and each open at one end, the concavity configured to accept a head-mounted display; and at least one reversible connector configured to reversibly retain the head-mounted display accepted in the concavity, wherein when the head-mounted display is accepted and retained in the concavity and the sides are substantially flush with the head-mounted display;

a strap comprising two ends and a reversible connector at each end, the strap convertible to reversibly attach to the body to form a satchel strap or to reversibly attach to the head-mounted display to form a head-mounted display strap; and the head-mounted display accepted and retained in the concavity is configured to internally store a mobile computing device.

13. The satchel of claim 12, wherein the satchel further comprises a reversibly closable lid enclosing the open end of the interior of the satchel.

14. The satchel of claim 12, wherein the head-mounted display is a full-sized head-mounted display.

15. The satchel of claim 12, wherein the head-mounted display is a virtual reality head-mounted display.

16. The satchel of claim 12, wherein the head-mounted display is an augmented reality head-mounted display.

17. The satchel of claim 12, wherein the at least one reversible connector of the body is magnetic.

18. The satchel of claim 12, wherein the reversible connectors of the strap are magnetic.

19. The satchel of claim 12, wherein the concavity is configured to accept the head-mounted display without reducing the storage capacity of the interior of the satchel.

20. The satchel of claim 12, wherein the strap has an adjustable length.

* * * * *